Patented Mar. 14, 1933

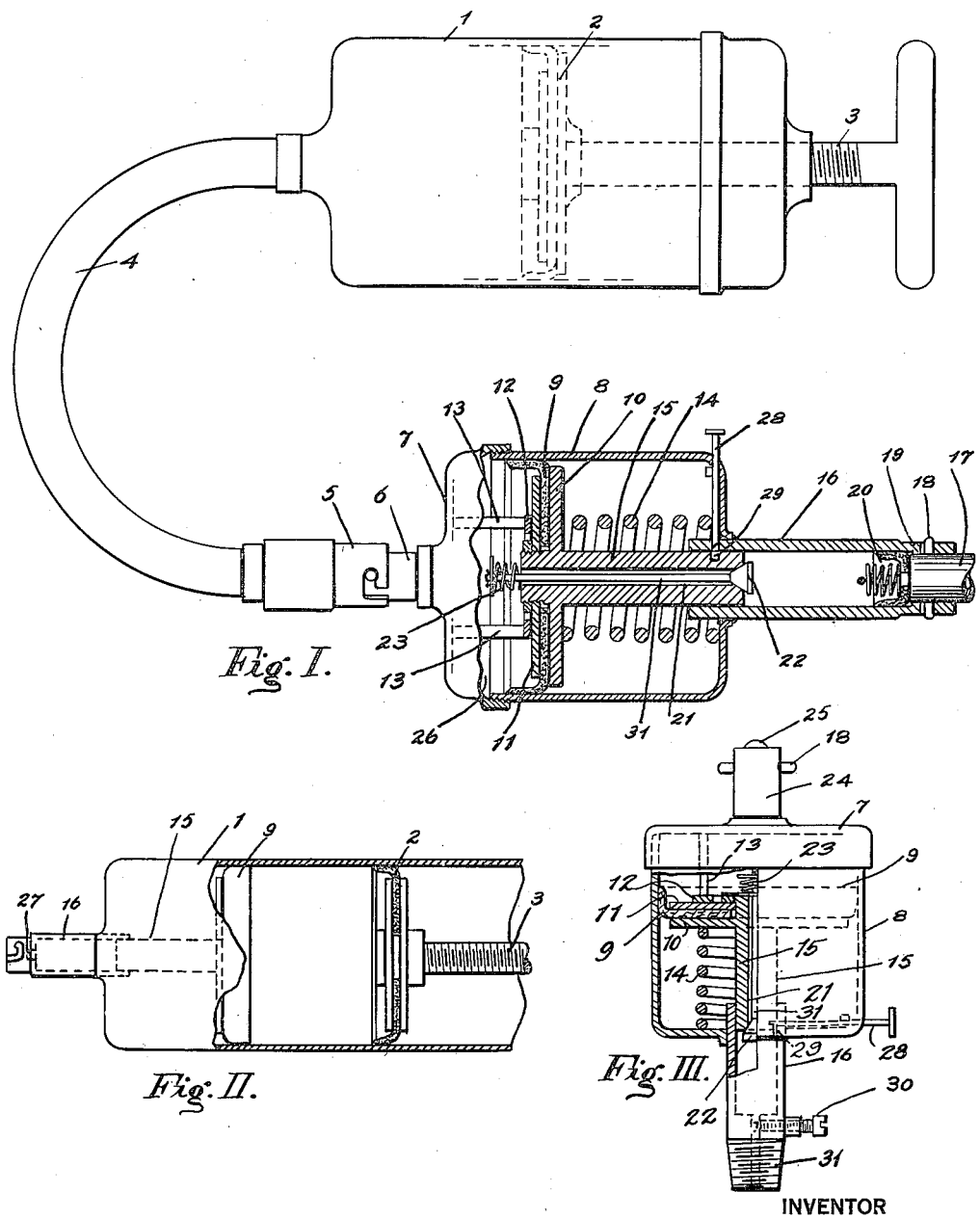

1,901,148

UNITED STATES PATENT OFFICE

JOHN L. CREVELING, OF NEAR TUCSON, ARIZONA, ASSIGNOR TO THE LUBRICATION CORPORATION, OF SOUTH BEND, INDIANA, A CORPORATION OF DELAWARE

LUBRICATING MEANS

Application filed May 31, 1924, Serial No. 717,149. Renewed July 27, 1932.

My invention pertains to lubricating means of that type employed for forcing a lubricant into desired places, as between bearing surfaces, under pressure, and comprehends means whereby a relatively moderate pressure may be exerted upon the lubricant which may be forced thereby into certain lubricating means or between surfaces, as may be desired, and means whereby the pressure upon the lubricant will automatically be increased when such increase becomes necessary to cause it to be forced into the locations desired, as will hereinafter more plainly appear.

Fig. I is a partial elevation and partial section of one form of structure comprehending my invention;

Fig. II is a partial elevation and partial section indicating a modified form of structure also comprehending my invention; and Fig. III is an elevation of a structure in which my invention is embodied.

In the drawing, referring to Fig. I, 1 represents any suitable type of compressor or pump adapted to supply a lubricant under pressure and, in this instance, is indicated as of the ordinary well-known variety comprising a cylindrical portion adapted to contain a lubricant which may be ejected by means of a piston 2, shown in dotted lines, operatively connected with a screw-threaded stem 3, rotation of which moves the piston 2. The pump or compressor is shown as operatively connected with one end of a tube or conduit 4, the opposite end of which is shown as in operative connection with a coupling member 5 adapted to fit upon a nipple 6 and to be held thereupon by a bayonet-joint connection, as illustrated, for the purpose of illustrating my invention as operating in conjunction with a well-known type of compressor and its usual tubular connection with a detachable coupling, as indicated at 5, since this arrangement is now a well-known article upon the market and in very wide use. The coupling 5 is arranged to form a fluid-tight connection with the nipple 6, and any means whereby this is accomplished may be employed and the specific means employed is not illustrated in the drawing as many types of such couplings and nipples are now well-known in the art and possess means for making such fluid-tight connections. It will further be obvious that the tube 4 may be connected directly with the nipple 6, if desired to have the entire structure assembled as one unit. The nipple 6 is carried by the cap or shell 7 into which is screwed the shell or cylinder shown in section at 8 containing a piston comprising the cup-shaped packing 9 securely held against the flange 10 by the flange 11, as indicated, and pressed in a left-hand direction by spring 14 against the annular ring 12, carried by the members 13 attached to the shell 7, as indicated. The flange 10 has formed integrally therewith a plunger 15 fitting within the bore of the cylinder 16, provided at its free end with suitable means for engaging any type of fitting through which it is desired to force a lubricant, in this instance indicated as a hollow nipple 17 provided with pins 18 adapted to engage slots in the extension 19 so as to form therewith a bayonet-joint similar to that of the coupling 5 and hold the extension 19 in place upon the nipple 17. 20 indicates any suitable type of device for insuring a fluid-tight connection between the interior of the cylinder 16 and the bore of nipple 17, in this instance being indicated as a cup-shaped piston. The plunger 15 is provided with a passage or duct 21 extending through the entire length thereof and adapted to be closed at one end by the valve 22 normally held in a closed position as by the spring 23 acting upon the stem 31. 28 is a latching device carried by the shell 8 and capable of being pressed into the notch 29 within the plunger 15 so as to restrain the said plunger from moving in a right-hand direction, if this be desired.

In Fig. II like numerals are used to indicate like parts and the only modification intended to be brought out by the use of this figure is that the mechanism contained within the shell 8 of Fig. I may be contained within the pump or compressor 1 instead of united therewith as by means of the flexible connection 4 of Fig. I.

In Fig. III like numerals are used to indicate like parts and the modification intended to be brought out by means of this figure resides in providing the nipple 24 with a ball-valve 25 instead of the plain nipple 6 of Fig. I which requires no valve therein, as will hereinafter be more fully pointed out; and the member 16 is shown as screw-threaded at its free extremity so that it may be used in place of an ordinary grease-cup instead of attached to any special fitting as shown in Fig. I. 30 indicates a check-screw which may be used, if desired, to restrict free passage of lubricant from the bore of the cylinder 16, as indicated in dotted lines.

An operation of my invention is substantially as follows:

Referring particularly to Fig. I, if the parts be arranged as shown in this figure and connected with the nipple 17, revolution of the screw 3 with respect to the cylindrical portion of the pump 1 will cause the piston 2 to exert pressure upon the lubricant contained in the compressor and force the same through the conduit 4, coupling 5 and nipple 6, into the space 26 between the shell member 7 and the piston 9, thence through the conduit or duct 21 of the plunger 15 into the cylinder 16, and thence, unless sufficient resistance be encountered, through the opening in the piston 20 and nipple 17 to the parts to be lubricated. If, however, the passage of the lubricant through and beyond the nipple 17 encounter sufficient resistance, the pressure exerted by the piston 2 and acting against the piston 9 will overcome the action of spring 14 and cause the piston 9 to move in a right-hand direction, whereupon the valve 22 by becoming seated will prevent the lubricant within the cylinder 16 from passing through the bore 21 of the plunger 15; and further movement of the said plunger 15 will force the lubricant contained in the cylinder 16 through the nipple 17 to the parts to be lubricated, owing to the fact that the area of the plunger 15 may be made as small as desired as compared with the area of the piston 9, and the force exerted by the piston 2 thereby multiplied by any factor desired. If, now, sufficient lubricant has been injected through the nipple 17, the threaded stem 3 may be revolved in a reverse direction and the piston 2 withdrawn, whereupon the suction created by said piston and the pressure exerted upon the lubricant in the chamber 26 by the spring 14 will cause the lubricant in the chamber 26 to flow back into the compressor 1 and spring 14 will cause the parts operated thereby to assume the position indicated in the drawing, whereupon the stem 3 may be again revolved so as to force another charge of lubricant through the passage 21 into the cylinder 16 and into the parts to be lubricated provided the injection of lubricant under high pressure, as above set forth, has sufficiently cleared the way that the resistance to further supply will not be sufficient to cause the piston 9 to move. And, if desired, the latch 28 may be caused to engage the slot 29 and hold the piston 9 in the position shown in the drawing; while the maximum pressure that can be produced by means of the compressor 1 may be exerted upon the bearing or other member connected with the nipple 17, and, if this pressure be sufficient, lubrication may be rapidly accomplished. If not, the latch 28 may be withdrawn and then the pressure exerted by the compressor 1 will act against the piston 9 to force the lubricant through the nipple 17 by means of the small plunger 15 in the cylinder 16, as outlined above, and this operation may be repeated as often as desired, it being noted that the nipple 17, being one of the usual fittings employed for this purpose, contains a ball-valve, as indicated in Fig. III, which prevents any of the lubricant from being drawn back into the cylinder 16 as soon as the pressure in the said cylinder is relieved slightly.

In the structure shown in Fig. II, the barrel of the compressor 1 is shown as provided with a rigid coupling or nipple 27 which, of course, may be replaced, if desired, by the flexible tube 4 and nipple 5 of Fig. I. The left-hand portion of the barrel of the compressor is to be considered as comprising the same instrumentalities as shown in section in Fig. I, and it will be obvious that revolution of the screw 3, by moving the piston 2, will cause the lubricant confined between the same and the piston 9 to operate in the same manner that the lubricant within the cavity 26 acted upon the piston 9 in Fig. I. But, with this structure if, instead of a rigid coupling 27, a tubular connection as shown in Fig. I be employed, the said tube will be subjected to the high pressure within the cylinder 16, while the arrangement shown in Fig. I subjects the tube only to the lower pressure produced by the compressor 1.

In Fig. III, the shell member 8 and cylinder or tube 16 contain the same elements as shown in section in Fig. I, and the structure of this figure is intended to be used as a grease-cup or oil-cup which may be attached by screwing its threaded nipple 31 into the part to be lubricated. Then, if the coupling 5 be made up upon the nipple 24 and lubricant forced into the space as indicated at 26 in Fig. I, the same may be forced into the part to be lubricated under high pressure by means of the motion of the piston 9, as described with reference to Fig. I, in order that an application of lubricant may be at once made under high pressure so as to force out any old and hard lubricant from between bearing surfaces. Then, when the piston 9 has been forced down against the spring 14 to its lowest position and the space 26, between the piston 9 and the shell 7, filled with lubricant, the sleeve or coupling 5 may be detached from the stem 24 and the valve 25 will immediately close and restrain any of the lubricant from being forced outwardly through the nipple 24, whereupon all the lubricant contained within the space 26 will be under the pressure exerted by the spring 14 and tend to pass through the duct 21 and cylinder 16 into the bearing to be lubricated as the lubricant therein becomes used up, in such manner that this device will operate not only as a high pressure pump, when necessary, but as a grease-cup adapted to supply grease under pressure as the same may be used up and required. If desired to regulate the flow of lubricant from this structure, as it may be under certain conditions, this may be accomplished by means of the check-screw 30 controlling the area of the outlet from the cylinder 16, as indicated in dotted lines.

From the foregoing it will be noted that I have produced a means whereby either a comparatively moderate pressure or an extremely high pressure may be exerted upon the lubricant in order to force the same into desired locations and that the manual operation may remain substantially the same under both conditions, while the device itself shifts from a comparatively low-pressure apparatus to a high-pressure apparatus when this change is required by the circumstances met in applying the lubricant, and the apparatus may automatically shift from a two-stage compressor to a single-stage compressor, as required, and, moreover, this shifting may be controlled when found desirable. Further, it will be noted that my device may be constructed so as to employ compressors such as are now found in wide use and serve in conjunction therewith or be made as a complete unit, as may be desired. Further, my invention may be employed to possess the two-stage compressor feature while a lubricant is being forced therein and serve as a pressure grease or oil cup to automatically supply grease or oil after its disconnection from the source.

I do not wish to be understood in any way as limiting myself to the forms of constructions shown in the drawing nor to the modes of operation outlined in this specification which are given to portray certain embodiments of my invention and explain the principle thereof, for it will be obvious that wide departure may be made both in structure and mode of operation without departing from the spirit and scope of my invention which is as set forth in the following claims:

1. A cylindrical reservoir having end closures, one of which has an outlet, a tube having one end fitted as a piston adapted to reciprocate in said outlet and the other end carried by and opening through a piston normally sustained by a spring against pressure of a body of lubricant in the reservoir so that the lubricant is forced through said tube into the nozzle so long as the pressure on the fluid is greater than the resistance or back pressure on the outlet nozzle, means for preventing back flow of lubricant through said tube when the spring pressed piston yields, and means for preventing disengagement of said reciprocating members.

2. A reservoir and booster lubricant cup comprising a cylindrical reservoir, a cylindrical outlet chamber of smaller diameter in alignment therewith, a differential piston member having a low pressure piston portion in said reservoir and a high pressure piston portion in said outlet chamber, means forming a detachable connection for a charging device for said reservoir, means for preventing escape of lubricant through said connecting means, means for preventing reverse flow of lubricant from said outlet chamber to said reservoir, yielding means for urging said differential piston in a direction to eject the lubricant from said reservoir through said outlet chamber into an element to be lubricated, and means for preventing disengagement of said piston member from said outlet chamber.

3. A reservoir and booster lubricant cup comprising a cylindrical reservoir, a cylindrical outlet chamber of smaller diameter in alignment therewith and adapted to be mounted on an element to be lubricated, a differential piston member having a low pressure piston portion in said reservoir and a high pressure piston portion in said outlet chamber, means forming a detachable connection for a charging device for said reservoir, means for preventing escape of lubricant through said connecting means, means for preventing reverse flow of lubricant from said outlet chamber to said reservoir, yielding means for urging said differential piston in a direction to eject the lubricant from said reservoir through said outlet chamber into the element to be lubricated, means for controlling the rate of said ejection of lubricant, and means for preventing disengagement of said piston member from said outlet chamber.

JOHN L. CREVELING.